Dec. 29, 1936.  J. W. MIJNSSEN  2,065,866
DETACHABLE RIM FOR VEHICLE WHEELS
Filed Aug. 11, 1936   2 Sheets-Sheet 1
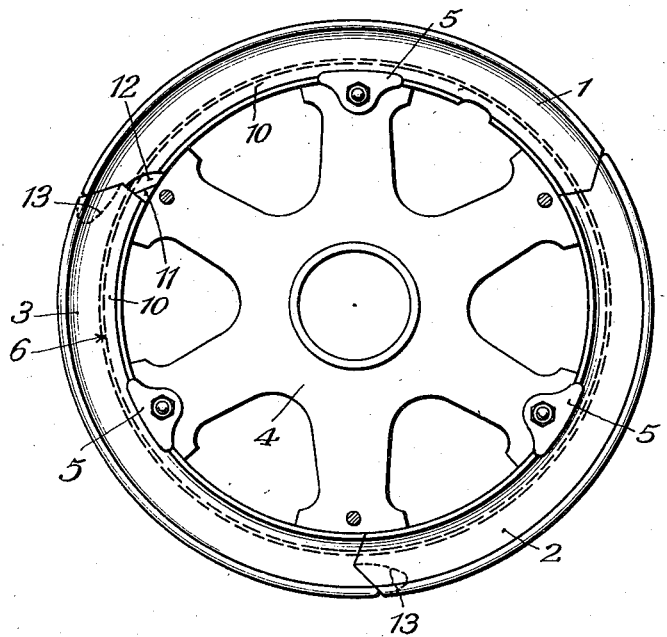
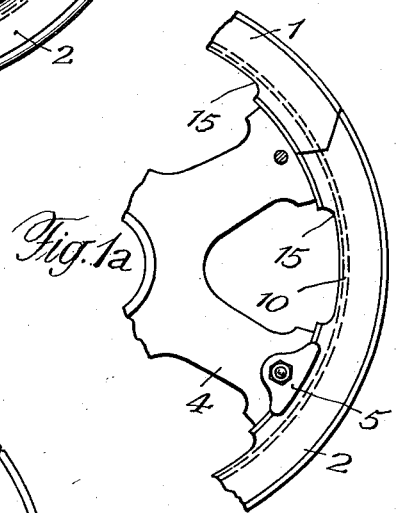
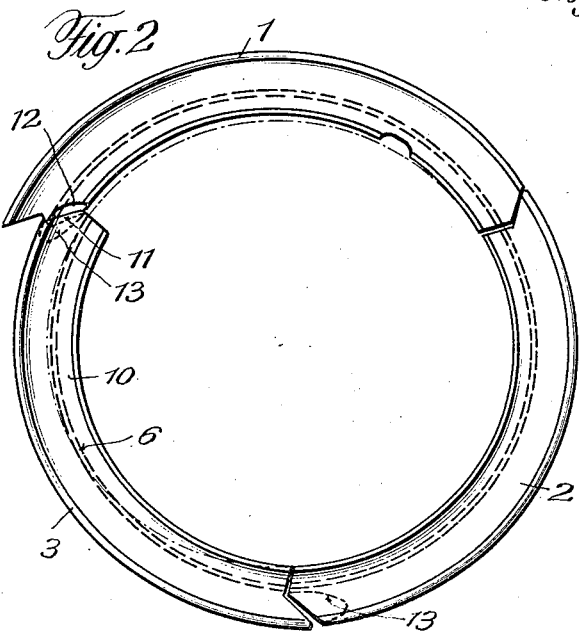
Inventor:
Jacob W. Mijnssen
By Sommers & Young
Attys Dec. 29, 1936. J. W. MIJNSSEN 2,065,866
DETACHABLE RIM FOR VEHICLE WHEELS
Filed Aug. 11, 1936 2 Sheets-Sheet 2
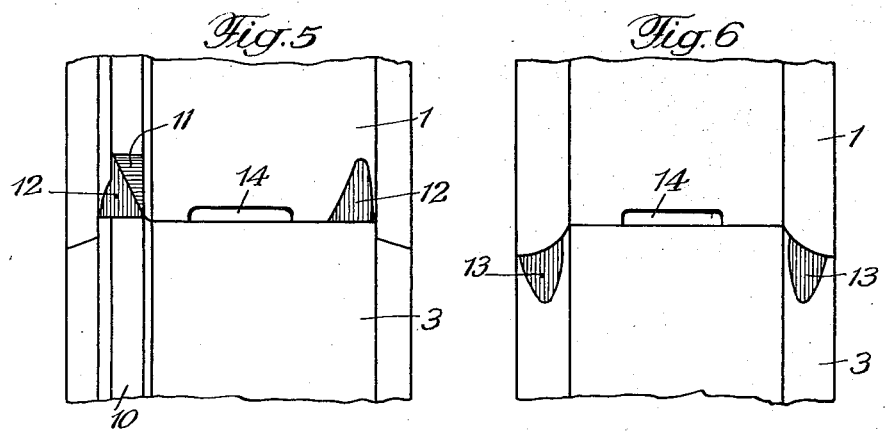
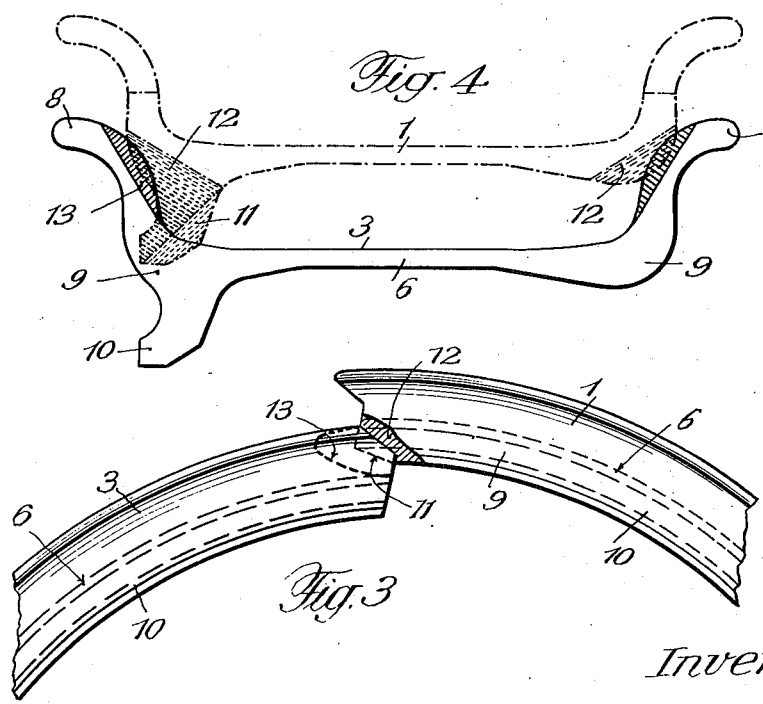
Inventor:
Jacob W. Mijnssen
By Sommers & Young
Attys.

Patented Dec. 29, 1936

2,065,866

UNITED STATES PATENT OFFICE 2,065,866

DETACHABLE RIM FOR VEHICLE WHEELS

Jacob Willem Mijnssen, Schaffhouse, Switzerland, assignor to Aktiengesellschaft der Eisen und Stahlwerke vormals Georg Fischer, Schaffhouse, Switzerland Application August 11, 1936, Serial No. 95,409
In Switzerland August 13, 1935

1 Claim. (Cl. 301—31)

There are detachable rims for vehicle wheels known which are composed of a plurality of segmental sections and have an undivided cross-section and are strengthened at the parts where the two side flanges join with the bottom portion of the rim, one of the strengthened portions being provided at the inner circumference of the rim with a circular seating projection for the rim to rest on the wheel body.

In the detachable rim according to the present invention the cross section of the rim is also strengthened at the parts where the bottom of the rim merges with the two side flanges thereof, but on one of the strengthened portions, on the radially inner circumference thereof, an annular projection for the rim to rest on a wheel body is provided, which projection carries on a first one of the segmental sections adjacent the butt end of the latter which is recessed in herringbone fashion a marginal tapering face, the said segmental section being further provided towards said butt end on its inner circumference at said strengthened portions with oblique faces, said tapering face on said segmental section joining with the adjacent oblique face at increased inclination so as to bevel it off towards the adjoining segmental section, and one or more of the other segmental sections being provided adjacent to the pointed herringbone fashioned butt end thereof on the inner sides of the side flanges of the rim with corresponding oblique faces.

In the accompanying drawings a constructional form of the invention is illustrated by way of example only, in which Fig. 1 shows an end view of a detachable rim of an undivided cross section and composed of three segmental sections in connection with a wheel spider on which the rim is secured;

Fig. 1a shows a portion of the wheel spider of Fig. 1 with two adjoining rim sections of modified construction connected thereto;

Fig. 2 represents an end elevation of the rim alone, the mating butt ends of two adjoining segmental sections being shown to be partly disengaged by offsetting the same to a certain extent in the radial direction;

Fig. 3 shows the relatively offset butt ends of the two segmental sections of Fig. 1 on a larger scale;

Fig. 4 shows these two relatively offset butt ends approximately in full size with the lower butt end in front and the higher butt end behind;

Fig. 5 is a view of the joint between these two adjoining segmental sections in normal relative disposition, as seen from the inner side of the rim, and Fig. 6 is an external view of the same joint.

The detachable rim is provided with an undivided cross section and is composed of three segmental sections 1, 2, and 3. The butt ends of the segmental sections interengage in herringbone shape, as evident from Fig. 1. This figure shows the rim to be mounted on a wheel spider 4 having six spokes and to be secured thereto by means of clamping plates 5. The joints between the abutting segmental sections are arranged at the heads of the spokes. The clamping plates holding the rim in position are not drawn in at the spoke heads where a joint between adjoining segmental sections is situated, in order to clearly expose the joints to view. As will be seen in Fig. 1, the length of arc of the segmental section 1 is chosen to be greater a certain amount than the arc length of the segmental sections 2 and 3. The arc lengths may, however, also be equal for all the three segmental sections. Furthermore, it is feasible to make the segmental sections 1 and 2 of the same arc length, whereas the arc length of the segmental section 3 is made smaller.

The undivided cross section of the rim is composed of the rim bottom 6 and the two side flanges 7 and 8. At the parts where the rim bottom merges with the two side flanges 7 and 8, the cross section of the rim is provided with strengthened portions 9. On one of the strengthened portions 9 the inner circumference of the rim is provided with an annular projection 10 which serves for seating the rim on the wheel spider 4. The portion of the annular projection 10 present on the segmental section 1 carries a marginal tapering face 11 which is inclined to the radial direction and extends up to the butt end of the segmental section 1 which is recessed in herringbone fashion. The segmental section 1 is provided on its inner circumference, adjacent to the butt end described immediately above at the strengthened portions, that are situated at the parts where the rim bottom merges with the side flanges, with oblique faces 12. The marginal tapering face 11 on the segment 1 joins with the adjacent oblique face 12 at increased inclination so as to bevel it off towards the adjoining segmental section.

The butt end of the segmental section 3 which is pointed in mating herringbone fashion for abutting on the segmental section 1 is provided with corresponding oblique faces 13 on the inner sides of the side flanges 7 and 8 adjacent to its butt end. Also the segmental section 2 may be provided with oblique faces 13 adjacent to its butt end pointed in herringbone fashion. The butt end of the segmental section 1 which carries the oblique faces is provided on the rim bottom with a recess 14 for introducing a nose of a bent off implement by means of which the herringbone shaped butt ends of the segmental sections 1 and 3 can be forced into interengagement.

The device described serves the purpose to decrease the amount of offsetting of the butt ends of two adjacent rim sections, as usually required during assembling and disassembling the latter, by the corresponding oblique faces that cooperate with one another, inclusive of the tapering face on the first one of the sections, sliding past one another in the sense of interengagement or disengagement of the respective adjoining rim sections. In this way, on the other hand, a reduction of deviation of the rim from the circular shape is obtained during these operations, so that clearance between the rim bottom and the base of a tyre to be mounted on the rim is dispensable.

Alternatively, the annular projection 10 on the inner circumference of the rim may be provided with recesses between its points of seating on the spoke heads of the wheel spider. Such a recess is shown in Fig. 1a and referred to by the numeral 15. Provided that such recesses 15 are present, it is feasible to mount the detachable rim on the wheel spider and to demount the same respectively without the necessity of removing the clamping plates 5, i. e. the bolts of the clamping plates 5 need only be loosened, whereupon the rim is applied to the wheel spider in a similar manner as connecting a bayonet joint, while at the beginning of this operation, incidental to the rim being pushed on axially, the clamping plates 5 enter the recesses 15, whereas on subsequently turning the rim relative to the spider the recesses 15 assume positions away from the spoke heads and the clamping plates 5.

I do not limit myself to the particular size, shape, number or arrangement of parts as shown and described, all of which may be varied without going beyond the scope of my invention as shown, described and claimed.

What I claim is:

Detachable rim for vehicle wheel bodies, a plurality of segmental rim sections of an undivided cross section being strengthened at its parts where the two rim side flanges join with the bottom portion of the rim, an annular projection on the radially inner circumference of one of said strengthened portions of said rim for the latter to rest on a wheel body, a marginal tapering face carried on said projection on a first one of said segmental sections adjacent to the butt end which is recessed in herringbone fashion, oblique faces provided on said first segmental section on its inner circumference at said strengthened portions, said tapering face on said first segmental section joining with the adjacent one of said oblique faces at increased inclination so as to bevel it off towards the adjoining segmental section, and oblique faces corresponding to said oblique faces on said first segmental section provided on at least one of the other segmental sections adjacent to the pointed herringbone fashioned butt end thereof on the inner sides of the rim side flanges.

JACOB WILLEM MIJNSSEN.